June 19, 1934.  E. M. SHINKLE  1,963,104
STOP FOR ROTATING PARTS
Filed July 23, 1932
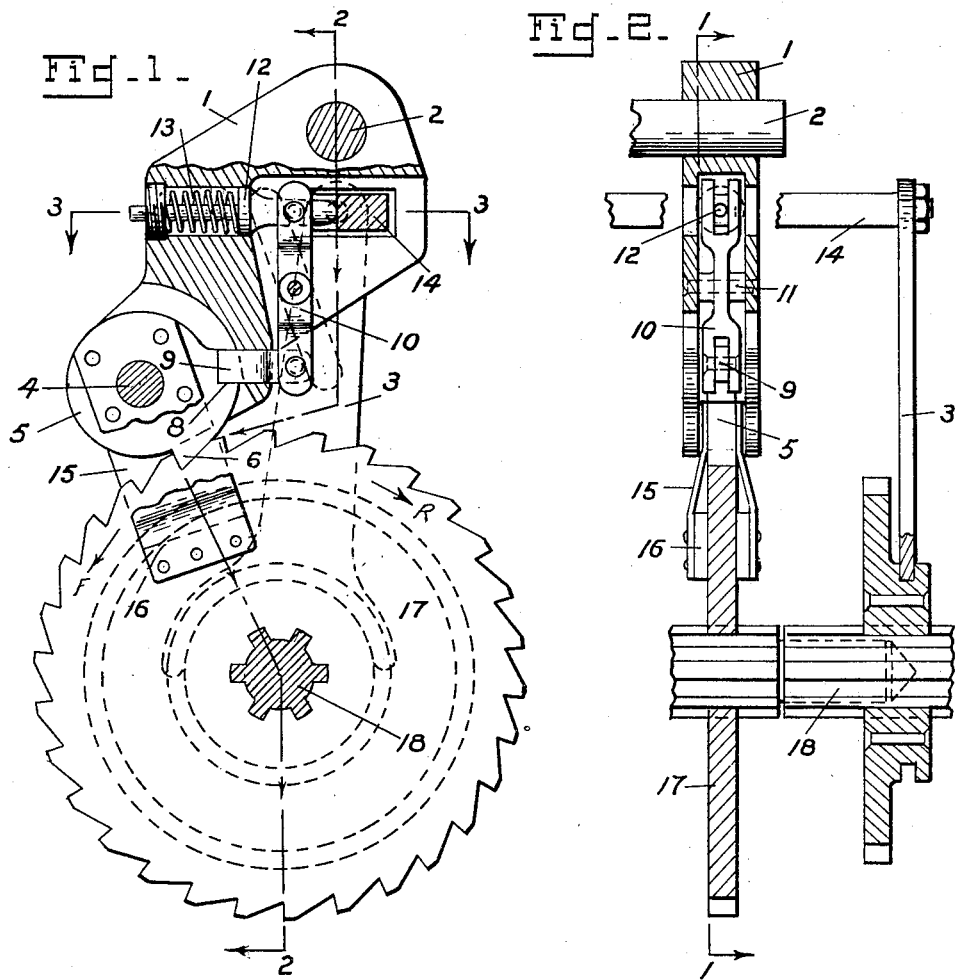
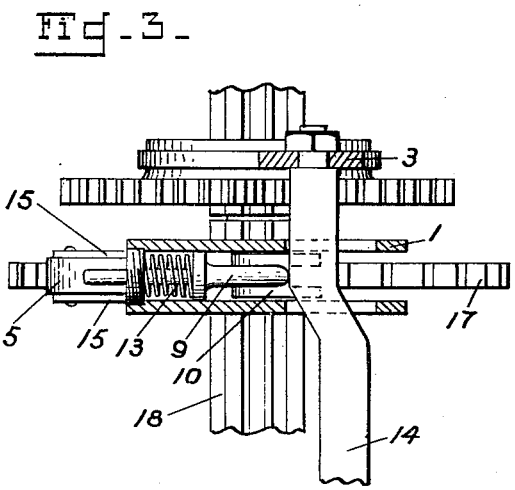
Inventor
Edward M. Shinkle
W. N. Roach
Attorney

UNITED STATES PATENT OFFICE 1,963,104

STOP FOR ROTATING PARTS

Edward M. Shinkle, United States Army, Higginsport, Ohio

Application July 23, 1932, Serial No. 624,165

1 Claim. (Cl. 192—4)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is stop for rotating parts.

This invention relates generally to mechanism for preventing rotation of a driven member in one direction and more especially to means mounted adjacent to a shaft, pinion or the like for preventing its rotation, save in a given direction, that is, clockwise or counter-clockwise as the case may be.

This invention constitutes an improvement in and further development of the invention disclosed in Patents Nos. 1,625,571, 1,830,135, 1,849,727 and 1,857,408 heretofore granted me.

The main object of this invention is to adapt the mechanism disclosed in the above mentioned patents to the improvements in transmission gearings made since the dates the patents already granted were applied for.

Specifically, when applied to transmissions for automobiles, it is to provide that when an automobile is moving rearward under the action of its transmission gearing and the transmission is shifted to neutral or to any forward gearing, the stop mechanism shall not operate to prevent backward movement until after the rearward motion of the vehicle has stopped, and the vehicle has moved forward.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a sectional view on the line 1—1 of Fig. 2 showing the arrangement of a single acting pawl.

Fig. 2 is a sectional view on the line 2—2 of Fig. 1.

Fig. 3 is a sectional view on the line 3—3 of Fig. 1, the parts shown in reverse position.

Referring to the drawing by numerals of reference:—

A pawl body 1 is mounted for slight rocking movement on the shaft 2 which is in position to be controlled through shifting of the shifting fork 3 as will hereinafter more fully appear. Mounted for rocking movement on a shaft 4 carried by the pawl body 1 is a pawl 5, formed with a tooth 6 and a notch 8, the sides of which notch are preferably disposed at a right angle to adapt the notch to receive the end of a bar 9 which has a sliding fit in a slot formed in the pawl body 1.

The bar 9 is pivotally connected to one end of a lever 10, fulcrumed intermediate its ends on a fulcrum 11 carried by the pawl body 1, the other end of which lever has pivotal connection with a spring pressed plunger 12 housed in a recess in the body 1 and urged in one direction by a coil spring 13. A control rod 14, similar to the rods described in the before mentioned patents, is shiftable through an aperture in the body 1, being shifted with the shifting gear, to cam the plunger 12 against the tension of the spring 13 and thereby rock the lever 10 to withdraw bar 9 from the notch 8, when the gear is shifted to reverse, thus freeing the pawl 5. As will be apparent from a consideration of Fig. 1, the aperture in the body 1, is only of sufficient extent to permit slight or restricted rocking movement of the body.

The pawl 5 has mounted thereon plates 15—15, carrying friction members 16—16 which are adapted to engage a ratchet or gear wheel 17, fast on the drive shaft 18.

The operation of the pawl is as follows:

When the gears are shifted to reverse, the control rod 14 cams plunger 12 to one side against the tension of a spring 13 thereby rocking lever 10 and withdrawing bar 9 from notch 8 thus freeing pawl 5. Movement of gear 17 in a clockwise direction, as viewed in Fig. 1, will cause the pawl 5 to rock upon its shaft to release the gear 17. By reason of the friction elements 16 contacting the gear 17, the pawl 5 will be held in its rocked position as long as gear 17 moves in such clockwise direction. When the direction of rotation of the gear 17 is reversed the plates 15 and pawl 5 will be rocked in a direction to cause the pawl 5 to engage, through its tooth 6, with the gear 17, in which position the bar 9 will again enter the notch 8 under the action of spring 13. Further rotation of the gear 17 in a counter clockwise direction will then rock the body about shaft 2, and the pawl 5 will clear the teeth of the gear.

It will be readily understood from the foregoing that it will be impossible to cause the pawl 5 to engage gear 17 while the vehicle, after being operated in reverse, continues to drift under the momentum received, thus avoiding the shock and strain incident to engagement of the pawl with the gear while in motion and the breakage of such parts in consequence thereof.

I claim:

The combination with a rotatable member provided with pawl engageable elements, of a pawl body mounted for rocking movement adjacent to said member, a pawl carried by said body and arranged for rocking movement independent of the body, a bar carried by the body and engageable with the pawl to lock the pawl against independent rocking movement, a control rod shiftable with a gear, an element on the body interposed between the bar and rod for shifting the bar when the rod is shifted in one direction to free the pawl, and friction elements connected to the pawl and engaging the rotatable member for causing disengagement of the pawl and holding it in such position until reversal of the movement of the rotatable member.

EDWARD M. SHINKLE.